(12) United States Patent
Weisshaar et al.

(10) Patent No.: US 12,244,504 B2
(45) Date of Patent: Mar. 4, 2025

(54) AUTOMATIC TESTING OF NETWORKS USING SMART CONTRACTS

(71) Applicant: Salesforce.com, Inc., San Francisco, CA (US)

(72) Inventors: Barrett Weisshaar, Hillsboro, OR (US); Luis Campo Giralte, Dublin (IE)

(73) Assignee: Salesforce, Inc., San Francisco, CA (US)

( * ) Notice: Subject to any disclaimer, the term of this patent is extended or adjusted under 35 U.S.C. 154(b) by 472 days.

(21) Appl. No.: 17/655,102

(22) Filed: Mar. 16, 2022

(65) Prior Publication Data

US 2023/0300077 A1 Sep. 21, 2023

(51) Int. Cl.
| | | |
|---|---|---|
| *H04L 9/40* | (2022.01) | |
| *H04L 9/32* | (2006.01) | |
| *H04L 43/026* | (2022.01) | |
| *H04L 47/2475* | (2022.01) | |
| *H04L 47/2483* | (2022.01) | |
| *H04L 9/00* | (2022.01) | |

(52) U.S. Cl.
CPC ........ *H04L 47/2475* (2013.01); *H04L 9/3236* (2013.01); *H04L 43/026* (2013.01); *H04L 47/2483* (2013.01); *H04L 63/1425* (2013.01); *H04L 63/1433* (2013.01); *H04L 9/50* (2022.05)

(58) Field of Classification Search
CPC . H04L 47/2475; H04L 9/3236; H04L 43/026; H04L 47/2483; H04L 63/1425; H04L 63/1433; H04L 9/50
See application file for complete search history.

(56) References Cited

U.S. PATENT DOCUMENTS

| | | | | |
|---|---|---|---|---|
| 9,934,138 | B1* | 4/2018 | Bache | G06F 11/3688 |
| 10,263,869 | B1* | 4/2019 | Dzierwinski | H04L 43/50 |
| 2006/0174337 | A1* | 8/2006 | Bernoth | H04L 63/0263 726/11 |
| 2013/0272146 | A1* | 10/2013 | Jones | H04L 43/50 370/252 |
| 2020/0242591 | A1* | 7/2020 | Sevindik | H04L 9/50 |
| 2021/0037060 | A1* | 2/2021 | Robison | H04L 63/123 |

OTHER PUBLICATIONS

Weisshaar, Barrett Allen, et al., Distributing Dynamic Access Control Lists for Managing Interactions With a Cloud Datacenter, U.S. Appl. No. 17/034,646, filed Sep. 28, 2020.

* cited by examiner

*Primary Examiner* — Abdulkader M Alriyashi
(74) *Attorney, Agent, or Firm* — Kwan & Olynick LLP

(57) ABSTRACT

In some embodiments, a method stores an executable contract in a ledger. The executable contract is for a test to be performed on a network and includes terms for the test. The method receives an indication of traffic that is received at a network device. It is determined that the traffic is associated with the executable contract that is stored in the ledger based on the terms of the test. The method responds to the network device with a response indicating that the traffic is associated with the executable contract. The network device allows the traffic to be sent to a destination on the network to perform an operation for the test.

20 Claims, 9 Drawing Sheets

AUTOMATIC TESTING OF NETWORKS USING SMART CONTRACTS

FIELD OF TECHNOLOGY

This patent document relates generally to networking and more specifically to network security.

BACKGROUND

Maintaining the security of a company's network is becoming more important as attacks on networks exploit vulnerabilities that may exist. A company may engage with a third-party company to test the company's network. Different tests may be agreed upon, such as attack surface scanning, auditing, penetration testing, etc. Typically, a manual process is used to set up the agreements on which activities should be performed, and how the tests should be performed. For example, an entity ABC may agree with a third-party entity XYZ to perform a test. Entity ABC may manually provide terms for the test to entity XYZ. Then, entity XYZ may manually create the test for a network of entity ABC using the terms. The manual process may be prone to errors and also be time-consuming.

BRIEF DESCRIPTION OF THE DRAWINGS

The included drawings are for illustrative purposes and serve only to provide examples of possible structures and operations for the disclosed inventive systems, apparatus, methods and computer program products for network testing. These drawings in no way limit any changes in form and detail that may be made by one skilled in the art without departing from the spirit and scope of the disclosed implementations.

DETAILED DESCRIPTION

Figure 1:
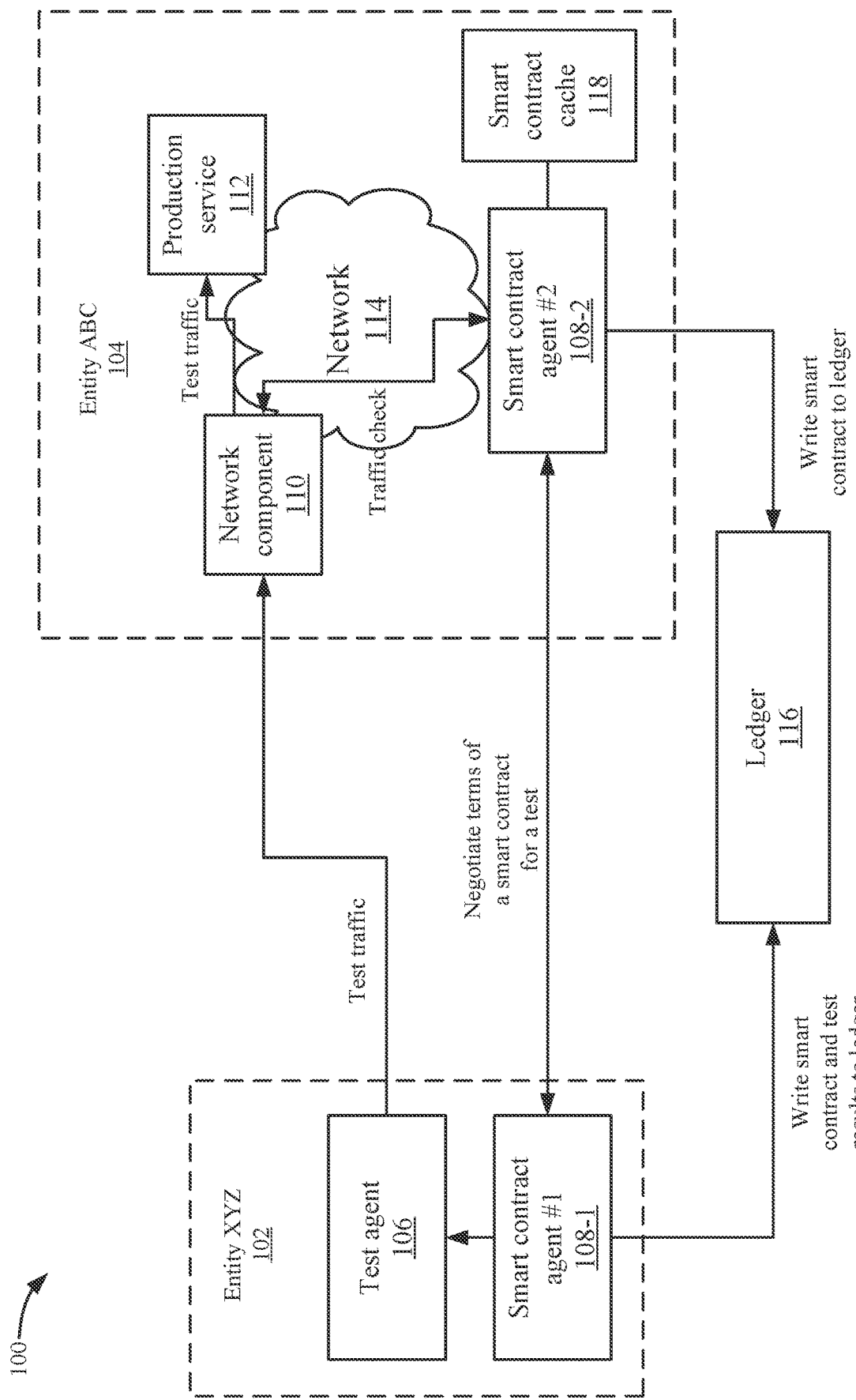
FIG. 1 depicts a simplified system for configuring and performing tests on a network according to some embodiments.

A system uses a smart contract and a ledger (e.g., a blockchain) to automatically perform a test on a network associated with an entity. In some examples, an entity XYZ may offer testing services that may test the security of networks. An entity ABC may wish to receive these services because they would like to make sure their network is secure. Entity XYZ may configure a first smart contract agent and entity ABC may configure a second smart contract agent to agree to terms for the testing a network of entity ABC. The two smart contract agents may then interact to automatically agree upon the terms of a test. Then, upon agreement, the smart contract agents generate a smart contract with the terms for a test of the network associated with entity ABC. The smart contract agents store the smart contract in the ledger. The generation of the smart contracts is automated using the smart contract agents, which improves the efficiency of performing the test compared to having to manually trigger the test.

The smart contract may have a condition that triggers execution of the smart contract. For example, the smart contract may have a time, February 1 at 8 p.m. as a condition. When this condition is met, the first contract agent for entity XYZ receives an indication that the test should be performed. Entity XYZ prepares the traffic needed to perform the test according to the terms of the smart contract. For example, the smart contract uses terms to generate traffic based on source addresses to destination addresses in the terms. Entity XYZ may then perform the test by transmitting the traffic to the destination addresses. The destination addresses may be associated with devices on a network associated with entity ABC. Before being sent to the destination, a network component of the network associated with entity ABC receives the traffic. For example, the network component may be a firewall, or other type of security device, that first receives all traffic from outside the network. The firewall may analyze network traffic to determine whether an attack is being performed on the network. The network component may need to determine whether the traffic is in fact malicious (e.g., a real attack) or associated with a test (e.g., not malicious). For example, the network component may perform a countermeasure in the event of a real attack (e.g., quarantine the traffic). However, if the traffic is for a test, the network component should allow the traffic to enter the network such that the test can be performed. The second smart contract agent may perform the above check to determine whether traffic received at the network component is associated with a test. For example, the second smart contract agent of entity ABC may check that the traffic is associated with a smart contract that is currently performing a test. When the traffic is legitimately associated with a smart contract for the test, the second smart contract agent can indicate that the traffic is legitimate. Because this is a test of the network, the network component should not take counter measures for the test traffic. Accordingly, the network component can allow the traffic, which can be routed to its destination in the network to perform the test. Previously, information for the test traffic would have had to be manually entered on the firewall, such as the source addresses to destination addresses of packets are manually entered such that the network component will allow the traffic. The manual entry takes time and also wrong addresses may be entered.

Once the test is finished, the first smart contract agent may record information for the results of the test in the ledger. Accordingly, the ledger may store the terms of the test and the results of the test. The ledger may be immutable, which means information that is stored in the blocks of the ledger cannot be changed. This may provide proof of the terms and results in a historical record. The record avoids any question of which terms were used for the test. For example, if the test was manually agreed upon, there may be questions as to which IP addresses were provided to entity XYZ to use, and who made the mistake. Also, the record may be useful when IP addresses are ephemeral and changing over time. For example, a cloud provider of the network may continuously change IP addresses, which may make it hard to determine which IP addresses were active at what time.

System Overview

FIG. 1 depicts a simplified system 100 for configuring and performing tests on a network according to some embodiments. System 100 includes an entity XYZ 102 and an entity ABC 104. Entity XYZ 102 may include a smart contract agent #1 108-1 and a test agent 106. entity ABC 104 may include a smart contract agent #2 108-2, a network component 110, a production service 112, a network 114, and a smart contract cache 118. In some examples, entity XYZ 102 may be associated with a company that offers a testing service and entity ABC 104 may be associated with a company that wants to receive the services. Entity ABC 104 may be associated with a network 114 in which entity ABC 104 may want to test for security purposes.

As discussed above, entity ABC 104 may desire to test network 114 to determine any security vulnerabilities that may exist. Various tests may be performed, such as scans, audits, attack surface scanning, penetration testing, distributed denial of service (DDoS) attacks, or other tests. The following will discuss components that are used to automatically perform the tests.

Ledger 116 may be used to store information for the tests as will be discussed below. In some embodiments, ledger 116 may be a distributed ledger that may store records in blocks. The ledger is distributed in that different instances of the ledger may be stored in different computing devices. The blocks may be immutable in that information, once stored in the blocks, cannot be changed. The blocks may be linked together using cryptography, such as each block includes a cryptograph hash of the previous block, and other information, such as records. The hash may allow the information of the blocks to be verified. For example, if information in a block is changed, the hash for the next block may be used to verify that the information has been changed. Although a ledger is discussed, other storage devices may be used.

A first smart contract agent 108-1 and a second smart contract agent 108-2 (collectively smart contract agents 108) may be programs that can be executed to perform the functions described below, such as to agree upon terms of a smart contract for a test, write the terms of the smart contract to ledger 116, and also write the results of the test to ledger 116. Smart contract agent #1 108-1 may be associated with entity XYZ 102 and smart contract agent #2 108-2 may be associated with entity ABC 104. Smart contract agents 108 may be associated with wallets, which each have unique addresses that distinguish the wallets from each other. The addresses are used to uniquely identify entity XYZ 102 and entity ABC 104. For example, when writing a record in a block to ledger 116, a wallet address may be associated with the record. If entity XYZ 102 is associated with wallet address XYZ and entity ABC 104 is associated with wallet address ABC, then each entity can search blocks for respective addresses to determine the records that are stored using the wallets.

In some examples, entity ABC 104 and entity XYZ 102 may agree that network 114 should be tested. In some tests, entity ABC 104 may want to have tests performed periodically, such as every day at 8:00 p.m. Instead of manually generating the tests at 8:00 p.m. each day, smart contract agent #1 108-1 and smart contract agent #2 108-2 may automatically negotiate the terms of the test. Different terms may be defined, such as a test type, surface, and time. The test type may be the type of test that is going to be performed, such as a scan, audit, penetration testing, DDoS, or other type of test. Generally, tests may be related to the security of network 114. The surface may be the information that is used to send the test traffic. For example, the surface may be source addresses (e.g., source Internet protocol (IP) addresses) to destination IP addresses, ports, domain name server (DNS) names, or other information that can be used to route traffic. Time may be the duration of the test, such as a test may be run at 8 p.m. for one hour. In some examples, entity XYZ and entity ABC may agree that a scan may be run at 8 p.m. on Thursday and a penetration test may be run on Friday at 8:00 p.m. Also, the time may indicate a frequency, such as a test may be run every day at 8:00 p.m.

A test agent 106 is configured to perform a test of a network 114. Test agent 106 may generate test traffic, which is sent to network 114. Then, test agent 106 may determine the results of the test. For example, test agent 106 may prepare traffic based on a set of IP addresses on network 114 that are found in the smart contract. Test agent 106 sends the traffic to the IP addresses to test different aspects of network 114 for security concerns.

Network 114 may include multiple computing devices, such as servers, switches, hosts, and/or other types of computing devices. Network 114 may be a public cloud network, a private network, or other configurations of computing devices. Entity ABC 104 may have a production service 112, which may include different computing devices that provide a service offered by the company. Network 114 may include a network component 110 that may receive traffic from outside of network 114 (or inside of network 114). Then, network component 110 may analyze the traffic before the traffic is allowed to be sent to computing devices of production service 112. In some examples, network component 110 may be a firewall that receives traffic from the Internet. In general operation, the firewall may determine whether the traffic is a security concern or not, such as whether the traffic is a type of attack on network 114. The firewall may not allow the traffic to proceed to production service 112 if the traffic is considered a security concern. Also, the firewall may initiate counter measures to guard against an attack if the firewall determines the traffic is a security concern. However, the firewall may allow the traffic to proceed to computing devices of production service 112 if the traffic is not considered a security concern or is considered legitimate.

In an improvement to the operation of network component 110, network component 110 may receive the traffic and is configured to automatically determine whether the traffic is associated with a test or not. For example, network component 110 may check with smart contract agent #2 108-2 to determine whether traffic is associated with a smart contract. That is, entity ABC 104 may have agreed to terms of a test. If the traffic has characteristics associated with the terms of a smart contract, then smart contract agent #2 108-2 can indicate that this traffic is associated with a test. In some embodiments, smart contract agent #2 108-2 may look up smart contracts in a smart contract cache 118. Smart contract cache 118 may store smart contracts that are valid for a time duration, such as the current time, or a period of time (e.g., a day or multiple days, a month, etc.). Smart contract cache 118 may be used because ledger 116 may store a large amount of data and storing the entire ledger in memory or searching the entire ledger may use more resources than using smart contract cache 118. For example, storing smart contracts that are valid for a time period in smart contract cache 118 may be more efficient to store and query when traffic checks are received from network component 110. For example, storing smart contracts that are valid for the current day uses less storage and is faster to search compared to searching the entire ledger 116.

Based on checking whether there is an applicable smart contract for the test, smart contract agent #2 108-2 can send an indication to network component 110 that indicates whether the traffic is associated with a test or not. Upon receiving an indication of whether traffic is associated with a test or not, network component 110 may allow the test traffic to proceed to its destination. For example, if the traffic is associated with a test, network component 110 may allow the traffic to proceed to computing devices of production service 112. If the traffic is not associated with a test, network component 110 may process the traffic regularly, which may allow the traffic to proceed to computing devices of production service 112 or may perform a countermeasure on the traffic. Smart contract agent #1 108-1 may write the results of the test to ledger 116 to form a historical record of the terms and the test results.

To perform the automatic testing, smart contract agents 108 initialize the terms of the test in a smart contract. Then, the test is performed. The following will describe the test initialization method in FIGS. 2 and 3, and then a test performance method in FIGS. 4-6.

Test Initialization

Figure 2:
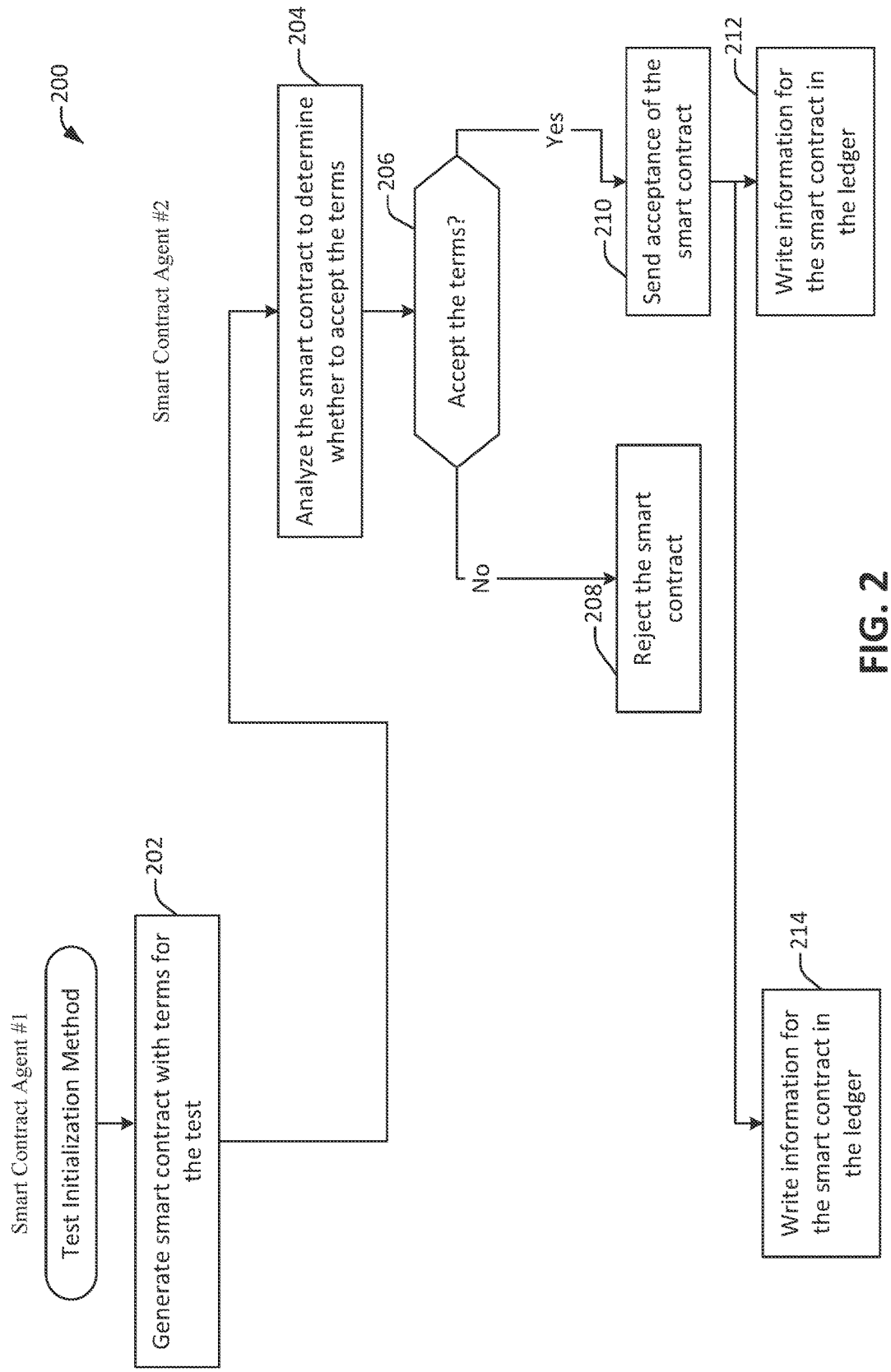
FIG. 2 depicts a simplified flowchart of a method for initializing a test according to some embodiments.

FIG. 2 depicts a simplified flowchart 200 of a method for initializing a test according to some embodiments. Elements in the method may be performed by smart contract agent #1 108-1 and a smart contract #2 108-2.

At 202, smart contract agent #1 108-1 generates a smart contract with terms for the test. Different terms may be used based on the test that is desired. At 204, smart contract agent #2 108-2 analyzes the smart contract to determine whether to accept the terms. For example, smart contract agent #2 108-2 may have logic that can analyze whether the proposed test is correct according to the prior agreements between entity ABC 104 and entity XYZ 102. As an example, entity ABC 104 may desire to have surface scans performed every day at 8:00 p.m. If the contract terms indicate that the test is for penetration testing on Thursday at 8:00 p.m., then smart contract agent #2 108-2 may reject the terms of the smart contract. However, if smart contract agent #2 108-2 determines the contract includes the correct terms, then smart contract agent #2 108-2 may accept the terms. Accordingly, at 206, smart contract agent #2 108-2 may determine whether to accept the terms. If the terms are not accepted, at 208, smart contract agent #2 108-2 rejects the smart contract. Rejecting the smart contract may involve smart contract agent #2 108-2 sending a response to smart contract agent #1 108-1 indicating the terms of the smart contract are rejected. In this case, a test may not be run or the terms may be renegotiated. However, at 210, if the terms are acceptable, smart contract agent #2 108-2 may send an acceptance of the smart contract to smart contract agent #1 108-1. Then, at 212 and 214, smart contract agent #2 108-2 and smart contract agent #1 108-1, respectively, write information for the test in a smart contract in ledger 116. In some embodiments, smart contract agent #2 108-2 and smart contract agent #1 108-1 may store their own versions of the terms in ledger 116. For example, if entity XYZ and entity ABC agree to the terms of the smart contract, then both can write information into ledger 116 that indicates their acceptance to the specified terms. In this way, the terms of the test and the acceptance of the terms may be explicitly stored in ledger 116 and cannot be disputed at a later time as being different than what was agreed upon. The smart contract may require that smart contract agent #2 108-2 and smart contract agent #1 108-1 write the same information for the smart contract in ledger 116 because the terms that are agreed upon should be the same.

Figure 3:
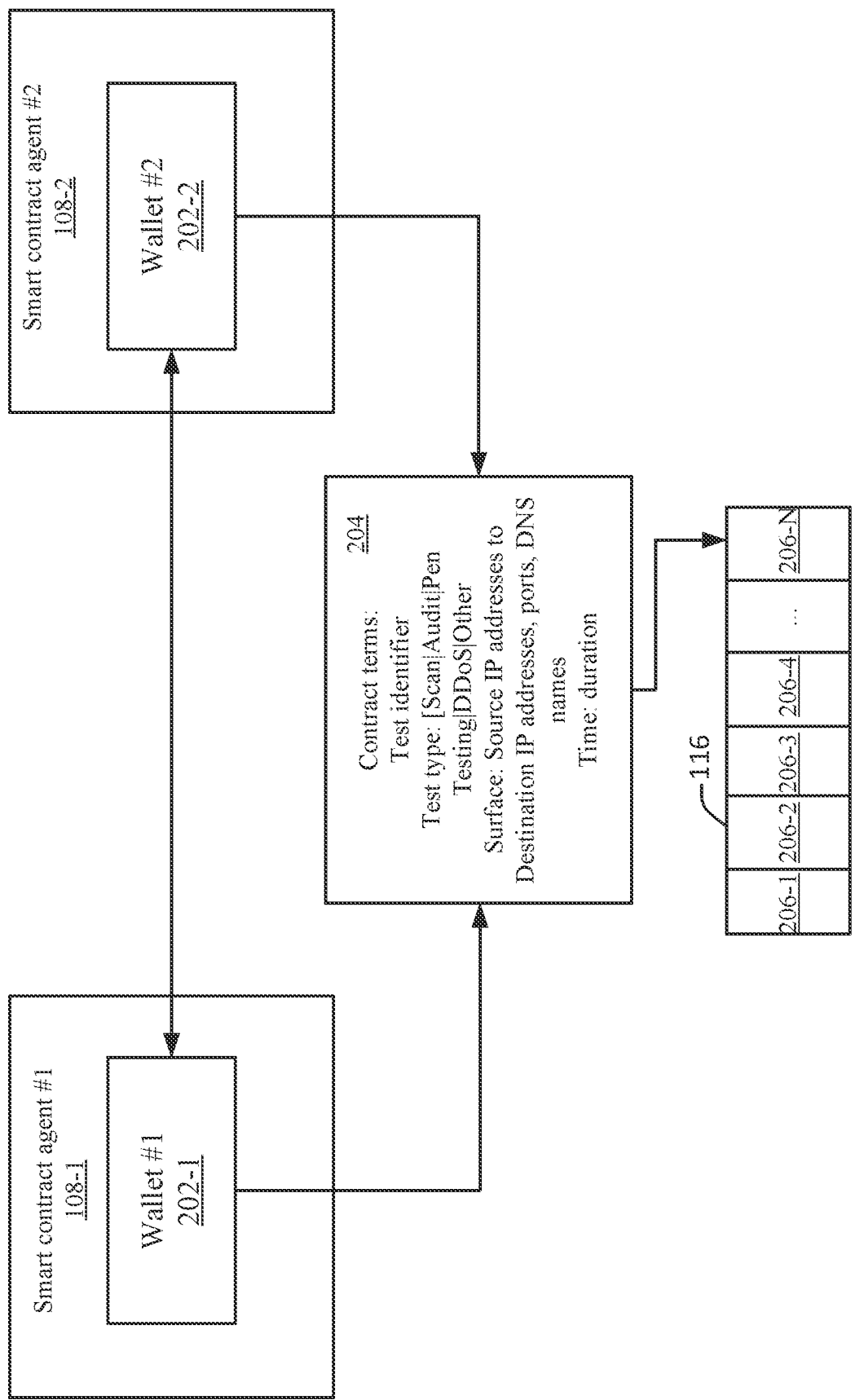
FIG. 3 depicts an example of writing terms to a ledger according to some embodiments.

FIG. 3 depicts an example of writing terms to ledger 116 according to some embodiments. Smart contract agent #1 108-1 may be associated with a wallet #1 202-1 and smart contract agent #2 108-2 may be associated with a wallet #2 202-2 (collectively wallets 202). Respective wallets 202 may have an associated wallet address. For example, wallet #1 202-1 may have a wallet address of "XYZ" and wallet #2 202-2 may have a wallet address of "ABC". The wallets may be used to identify the respective smart contract agents 108.

When the terms are negotiated and agreed upon, wallets 202 may write the smart contract terms, which are shown at 204, into a block 206 of ledger 116. The terms may include a test identifier that identifies the test being performed. For example, the test may be identified as "Surface scan testing on every day at 8:00 p.m.". The test type may select from possible test types, such as a scan, audit, penetration testing, DDoS, or other type of test. For example, the smart contract selects the test type as a "Surface scan". The terms include a surface, which may select the source addresses to destination IP addresses, ports, DNS names, or other information that can be used to route traffic. For example, the smart contract may select multiple source IP addresses to destination IP addresses, ports, and DNS entries. The time may select a time, such as every day at 8:00 p.m., where the test will last for one hour. The terms may indicate the test may be performed for one year. Other terms may also be appreciated. The smart contract may include a condition that is used to trigger execution. For example, the time may be used as the trigger, such as when 8:00 p.m. is reached, the smart contract is automatically executed.

Ledger 116 includes blocks 206-1 to 206-N. Each block may include records that may store information. After negotiating the terms of the smart contract, smart contract agent #1 108-1 writes the contract terms at 204 into a block 206-N of ledger 116 and smart contract agent #2 108-2 writes the contract terms at 204 into a block 206-N of ledger 116. The terms are stored with the respective wallet addresses such that the records can be attributed to smart contract agent 108-1 or 108-2. The smart contract terms do not need to be written to the same block, however. Once the smart contract terms are written into block 206-N, the record of the smart contract terms is immutable and cannot be changed. For example, a block may have a hash of the previous block. For example, a block 206-2 may have a hash of block 206-1. In this way, the content of each block may be verified and if information is changed at a later time, then the block may not be verified. Accordingly, once the terms are written to ledger 116, the terms are immutable and serve as a historical record.

The above process may initialize a smart contract for the test. Then, a test may then be performed.

Test Performance

Figure 4:
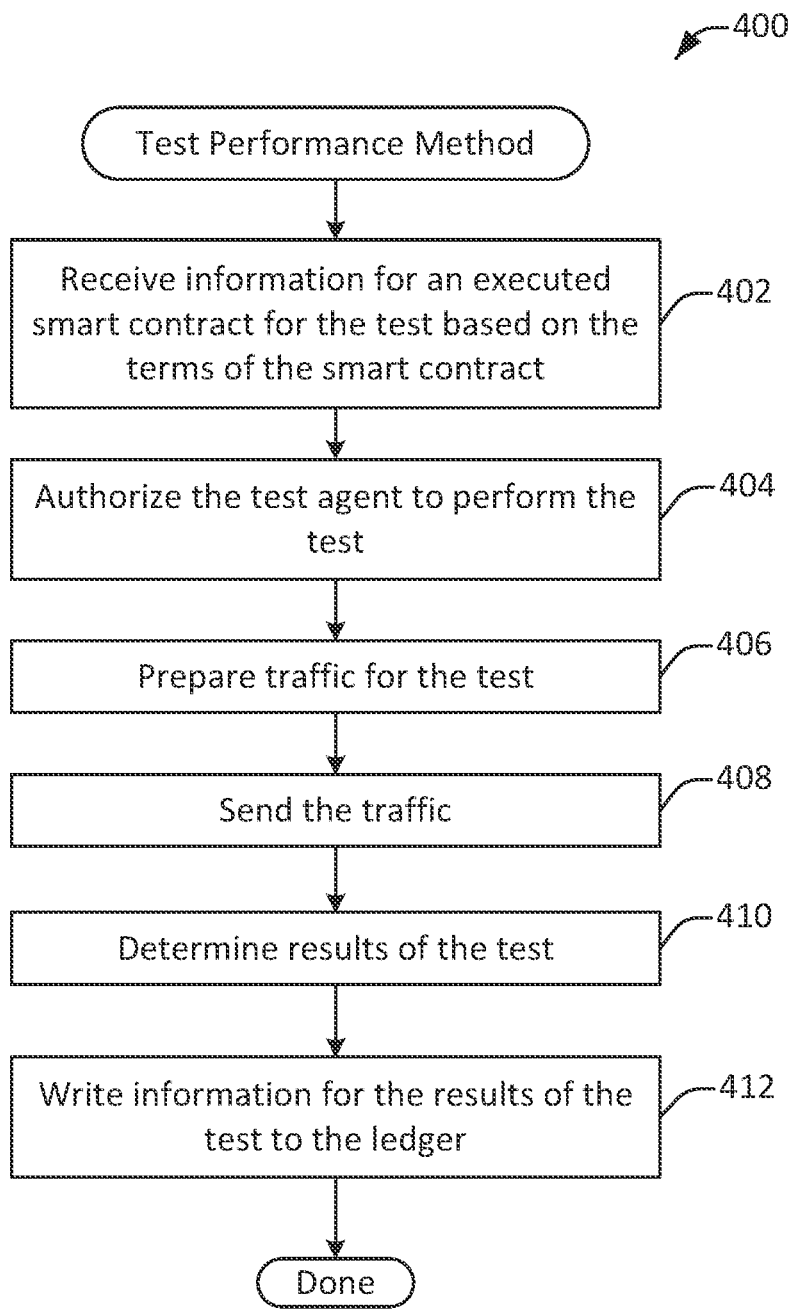
FIG. 4 depicts a simplified flowchart of a method for performing a test of the network according to some embodiments.

FIG. 4 depicts a simplified flowchart 400 of a method for performing a test of network 114 according to some embodiments. The following describes a single test being performed, but a smart contract may define multiple tests to perform, such as performing a test every day. At 402, smart contract agent #1 108-1 receives information for an executed smart contract for a test based on the terms of the smart contract. The smart contract may be stored with pre-determined conditions in ledger 116. When those conditions are met, the smart contract may be executed. For example, the smart contract for a test may have a start time set as February 1 at 8:00 p.m. When Thursday at 8:00 p.m. on February 1 is reached, the smart contract is executed automatically to prepare the test. When smart contract is executed, smart contract agent #1 108-1 receives information for the terms of the contract that were stored in a block 206 of ledger 116. Then, at 404, smart contract agent #1 108-1 may authorize test agent 106 to perform the test using the terms.

After receiving authorization, at 406, test agent 106 may use the terms to generate test traffic for the test. For example, test agent 106 may determine the type of test and the traffic that is needed to perform the test. Then, test agent 106 may use the source IP addresses to destination IP addresses to generate packets for the test. Test agent 106 may also perform other actions to prepare the traffic, such as translating DNS names, such as websites, to IP addresses, and then generating packets to the IP addresses for the DNS names. Other methods of generating traffic for the test may also be appreciated. For example, the smart contract may automatically prepare information for the test based on the terms, such as source addresses to destination addresses for packets.

After preparing the traffic for the test, at 408, test agent 106 sends the traffic based on the destination address. For example, test agent 106 sends packets to respective destination IP addresses associated with the packets. The traffic may be received at network 114, which is associated with entity ABC 104. The traffic is then processed by computing devices associated with network 114. The processing will be described in more detail in FIG. 5. Depending on how the traffic is processed, at 410, test agent 106 may determine the results of the test. For example, the results may indicate which IP addresses, ports, or other devices may have a security concern. In some examples, test agent 106 may determine that IP address #1 may be vulnerable for an attack. Different test results may be determined.

At 412, test agent 106 may cause the results to be written into ledger 116. For example, test agent 106 may send the results to smart contract agent #1 108-1, which then stores the results into ledger 116.

Figure 5:
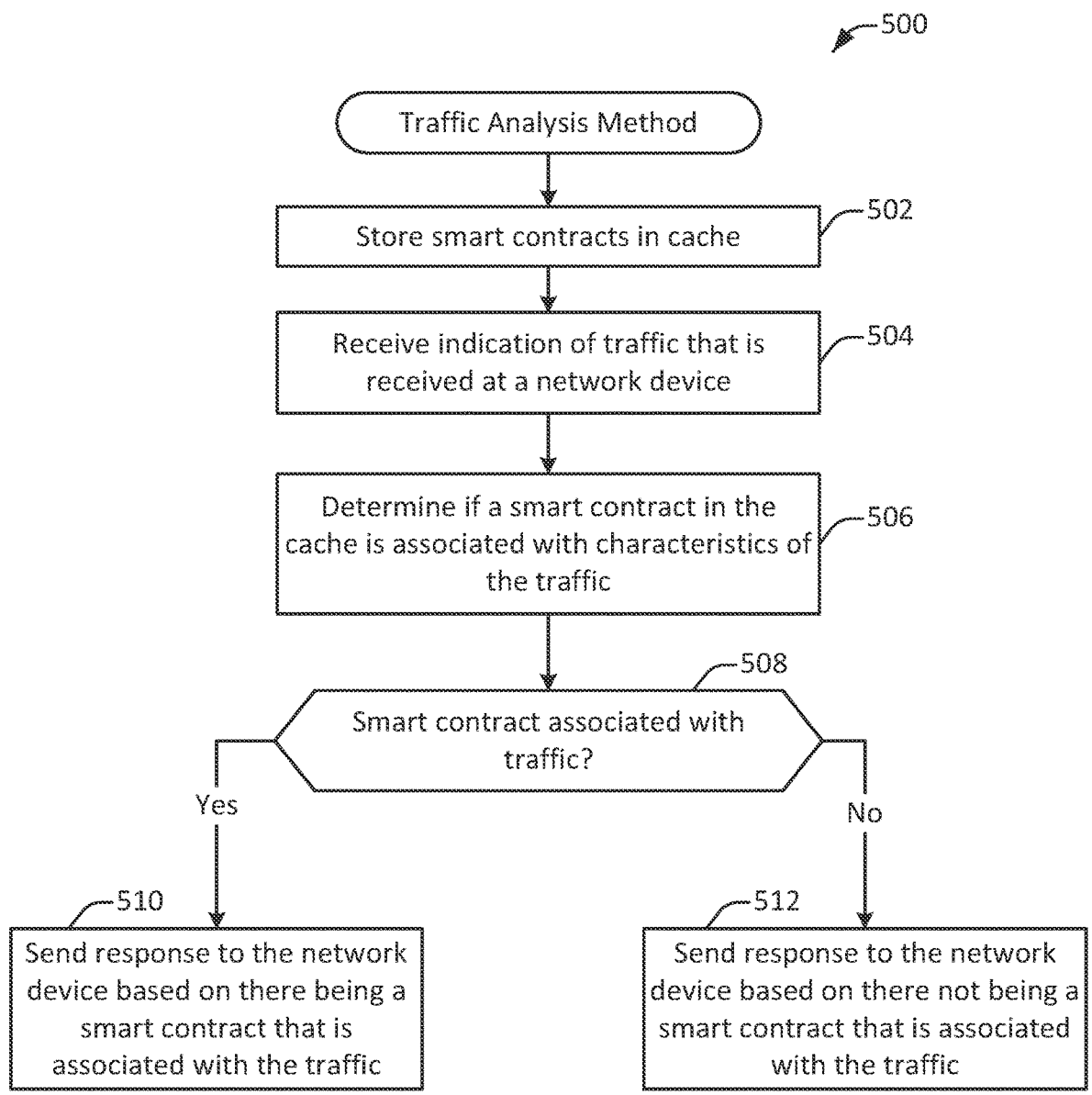
FIG. 5 depicts an example of the data flow for performing a test at the network according to some embodiments.

As discussed above, entity ABC 104 may receive the test traffic and process the traffic. FIG. 5 depicts a simplified flowchart 500 of a method for processing test traffic according to some embodiments. At 502, smart contract agent #2 108-2 stores smart contracts in smart contract cache 118. The contents of a ledger 116 may be very large and be continuously growing as blocks 206 are added to ledger 116. Accordingly, storing the contents of ledger 116 in memory may use a large amount of storage. Also, scanning blocks in ledger 116 may take a large amount of time and computing resources due to the size. Because smart contract agent #2 108-2 may analyze traffic that is received in real time, smart contract cache 118 may be used to improve the processing time to determine whether a test is associated with a smart contract. For example, smart contracts that may be valid for a time period are stored in smart contract cache 118. In some examples, for a 24-hour period, smart contract agent #2 108-2 may retrieve smart contracts from ledger 116 that are valid for that day, and store information for them in smart contract cache 118.

In some embodiments, smart contract agent #2 108-2 may query ledger 116 for smart contracts that are valid for a time period and receive the terms of the smart contracts. The information that is stored in smart contract cache 118 may include the contract terms. Also, less information than the contract terms may be stored, such as just the source addresses to destination addresses of traffic that should be received for the test that is being performed for the smart contract. The information that is stored allows smart contract agent #2 108-2 to determine whether traffic that is being received is for a test that was initiated based on a smart contract. In some examples, smart contract agent #2 108-2 stores smart contract #1 with source IP address #1 to destination IP address #2, source IP address #3 to destination IP address #4, etc.; smart contract #2 with source IP address #5 to destination IP address #6, source IP address #7 to destination IP address #8, etc. with a valid time duration.

At 504, smart contract agent #2 108-2 receives an indication of traffic that is received at network component 110. In some examples, network component 110 is a firewall operating on network 114 that receives all traffic that is directed to computing devices associated with entity ABC 104. The firewall may then send an indication that traffic is being received to smart contract agent #2 108-2. In some embodiments, a firewall may send information for all instances of traffic that are received to smart contract agent #2 108-2. That is, network component 110 sends information for traffic that may ultimately be traffic for tests that are being performed and also traffic that is not associated with tests. For example, non-test traffic, such as communications being performed for services on production service 112, may also be sent to smart contract agent #2 108-2. Smart contract agent #2 108-2 may thus analyze both test traffic and non-test traffic.

At 506, smart contract agent #2 108-2 determines if a smart contract in smart contract cache 118 is associated with characteristics of the traffic. For example, network component 110 may send the source IP address to the destination IP address for the traffic to smart contract agent #2 108-2. Smart contract agent #2 108-2 then looks up the smart contracts in smart contract cache 118 to determine if any smart contracts that are valid for the current time include the source IP address to destination IP address. That is, if a smart contract has a source IP address #1 to a destination IP address #2 as being valid on Thursday from 8:00 p.m. to 9:00 p.m. and the current time is 8:30 p.m., then traffic that has a source IP address #1 to a destination IP address #2 is associated with the smart contract. Conversely, smart contract agent #2 108-2 may not find the smart contract that includes has a source IP address #1 to a destination IP address #2 for the correct time, and this traffic is not associated with a test.

At 508, smart contract agent #2 108-2 determines if a smart contract is associated with the traffic. If so, at 510, smart contract agent #2 108-2 sends a response to network component 110 based on there being a smart contract that is associated with the traffic. If there is not a smart contract associated with the traffic, at 512, smart contract agent #2 108-2 sends a response to network component 110. The information that is sent to network component 110 may be different. In some examples, smart contract #2 108-2 may send a response that indicates the traffic is associated with a smart contract, may label the traffic as legitimate, or may send any other notation that will cause network component 110 to deliver the traffic to its destination. In contrast, smart contract agent #2 108-2 may send an indication that the traffic is not associated with a smart contract, is not legitimate, should not be allowed, or any other indication that causes network component 110 to not deliver the traffic to its destination. For example, a firewall may quarantine the traffic and not deliver it to the destination IP address if the traffic is labeled as not legitimate. Conversely, network component 110 may deliver the traffic to its destination at a server in production service 112 if the traffic is labeled as legitimate. A result based on sending the traffic to the destination may be recorded by test agent 106.

Accordingly, by using smart contract cache 118, smart contract agent #2 108-2 may analyze the traffic faster because less information needs to be searched compared to searching all blocks 206 of ledger 116. This improves the processing time of analyzing traffic. Also, by using smart contracts to analyze the traffic, manual settings on network component 110 may be avoided. Previously, network component 110 may have been manually configured with source IP addresses to destination IP addresses and a time in which the test should be performed. The manual configuration may be time-consuming, such as there may be a large amount of IP addresses to enter. Also, the manual configuration may also be prone to errors, such as IP addresses may be entered incorrectly. However, since the terms of the contract were agreed upon and stored in block 206 of ledger 116, errors on determining which traffic should be delivered to its destination and which traffic should not be delivered is automated and not prone to errors compared to using the manual process. This improves the operation of configuring network component 110 and the processing of traffic.

Figure 6:
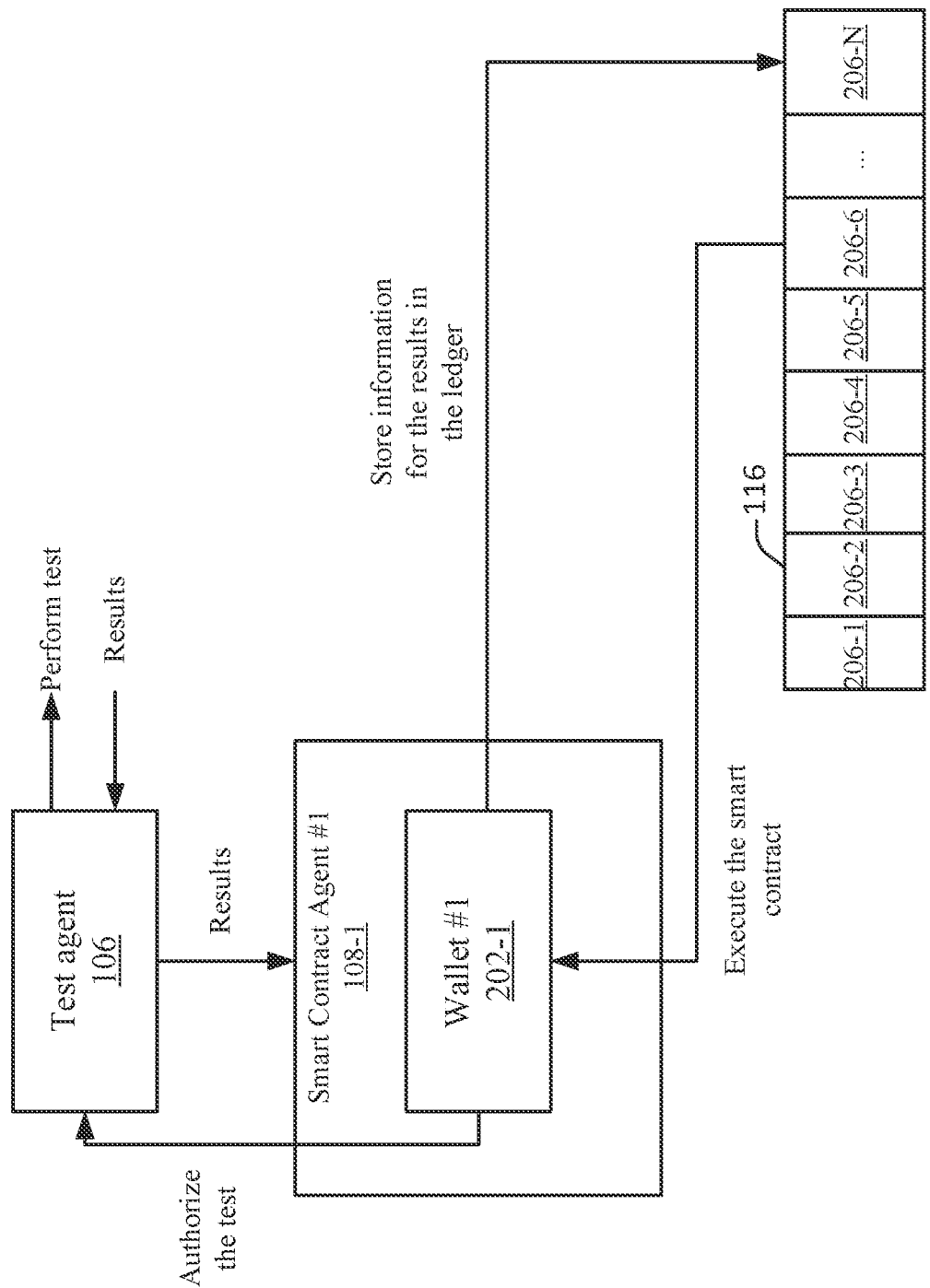
FIG. 6 depicts a simplified flowchart of a method for processing test traffic according to some embodiments.

FIG. 6 depicts an example of the data flow for performing a test at entity XYZ 102 according to some embodiments. Ledger 116 may store the smart contract in a block 206-6. Additional blocks 206 have been added to ledger 116 since the smart contract was stored. When the smart contract is executed, wallet #1 202-1 of smart contract agent #1 108-1 is contacted with the terms of the smart contract. Wallet #1 202-1 may then authorize the test. Test agent 106 may perform the test, receives the results, and sends the results to smart contract agent #1. Then, wallet #1 202-1 stores information for the results in a block 206-N in ledger 116. For example, because blocks 206 are added to ledger 116, the results may be stored in a block that is different from where the smart contract is stored. However, the results may identify the test such that the test results may be correlated to the smart contract for the test. Storing information for the results in ledger 116 may make the results public and immutable. Accordingly, a historical record of the results may persist and can be checked at a later time.

Ledger 116 may be a public ledger or a private ledger. A public ledger may not have any access restrictions; however, access to a private ledger may be restricted. For example, a public ledger may be viewed by anyone. A private ledger may be associated with a company, and can be only viewed by employees of the company. Accordingly, a company may store the information for the results in ledger 116 differently. If a private ledger is used, and the private ledger is only accessible to entity ABC 104 and/or entity XYZ 102, then the actual results may be stored in block 206-N. However, if a public ledger 116 is being used, which any user or company can access, then the actual results may not be stored in a block 206-N. Rather, an encrypted version of the results, a link to the results, or other methods for masking the actual results may be stored in block 206-N. The details of the original smart contract may also be stored using the same techniques as the results, such as the actual terms of the contract may not be stored in block 206-6.

Conclusion

Accordingly, smart contracts and ledger 116 are used to perform tests on network 114. This provides many advantages. For example, blocks 206 in ledger 116 may provide a historical record of which of the terms of the contract, such as source IP addresses to destination IP addresses, ports, etc. that are used to perform the test. This may be helpful when IP addresses are ephemeral and change over time, such as in cloud deployments. Also, the IP addresses that are used at the time of the agreement are agreed-upon and cannot be disputed. Further, the historical records of tests over time can be tracked in ledger 116. The automation of the test may also reduce errors that may occur when configuring the test or processing the tests.

Figure 7:
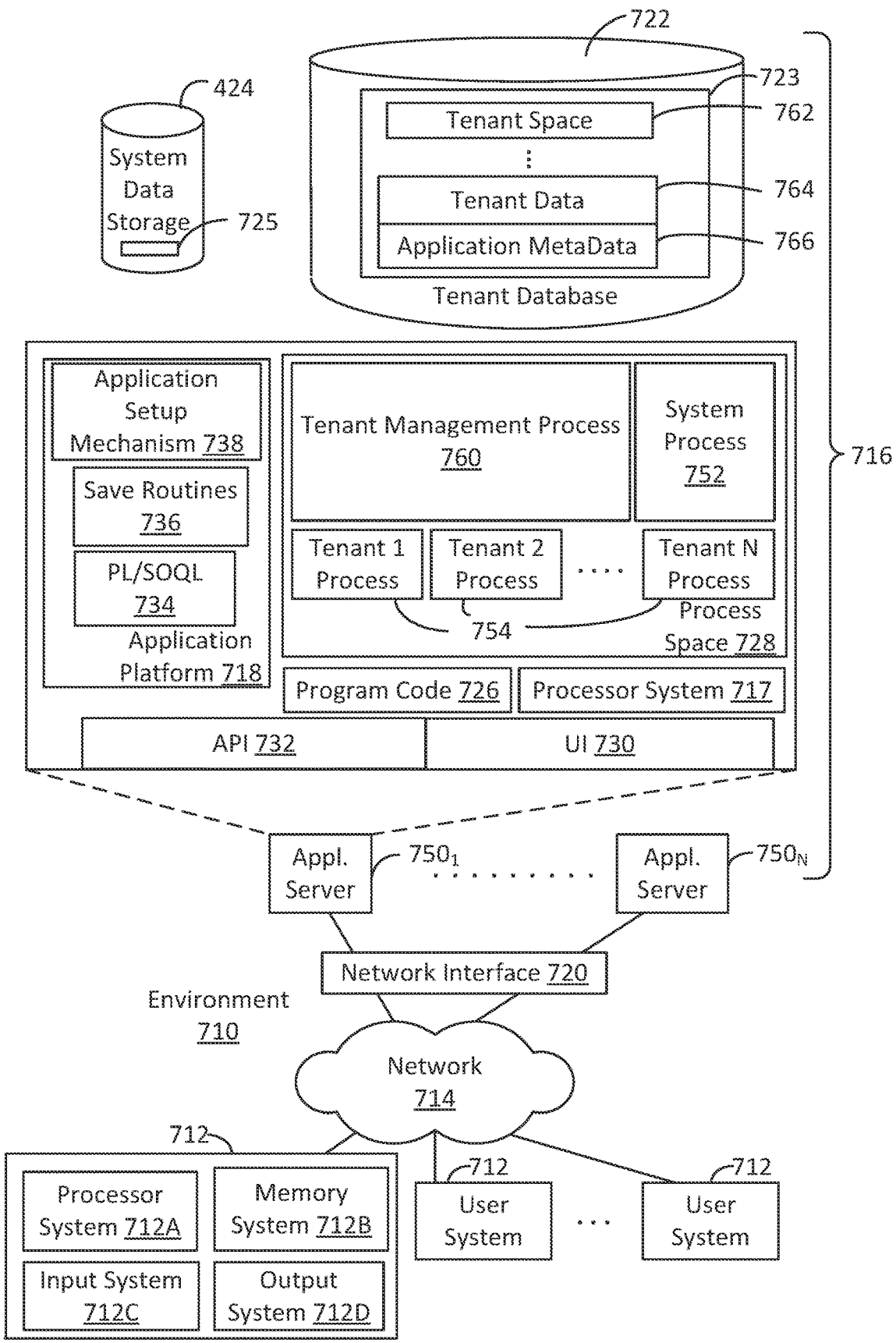
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based network security system. For example, in some implementations, system 716 may include application servers configured to implement and execute network security software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a network security, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
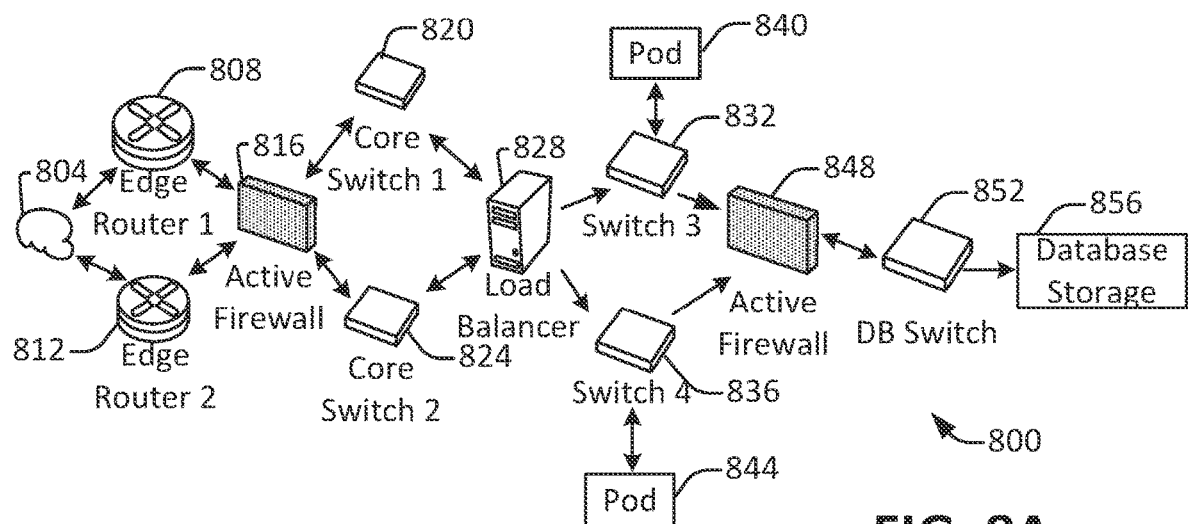
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process network security information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
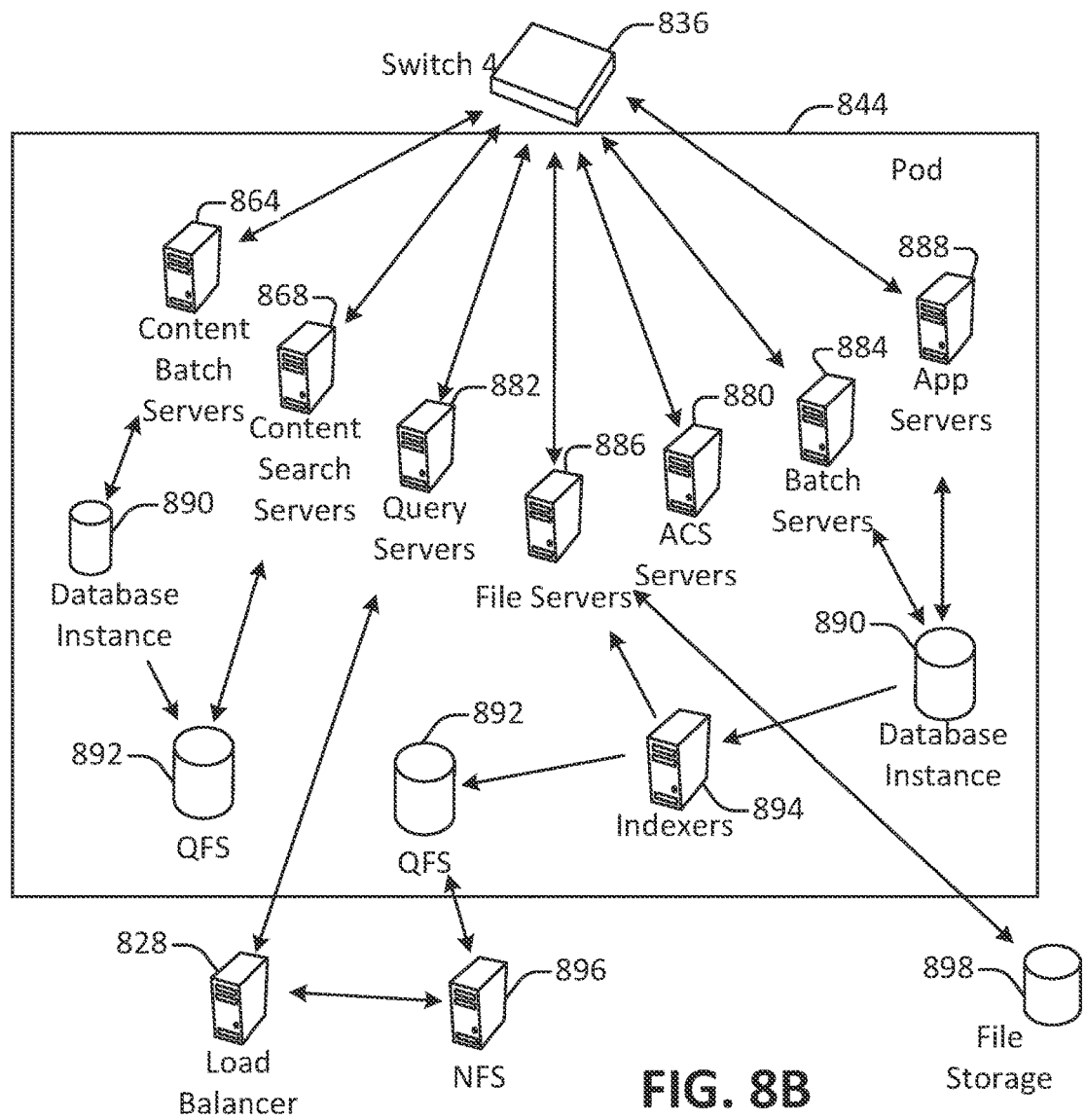
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBS), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
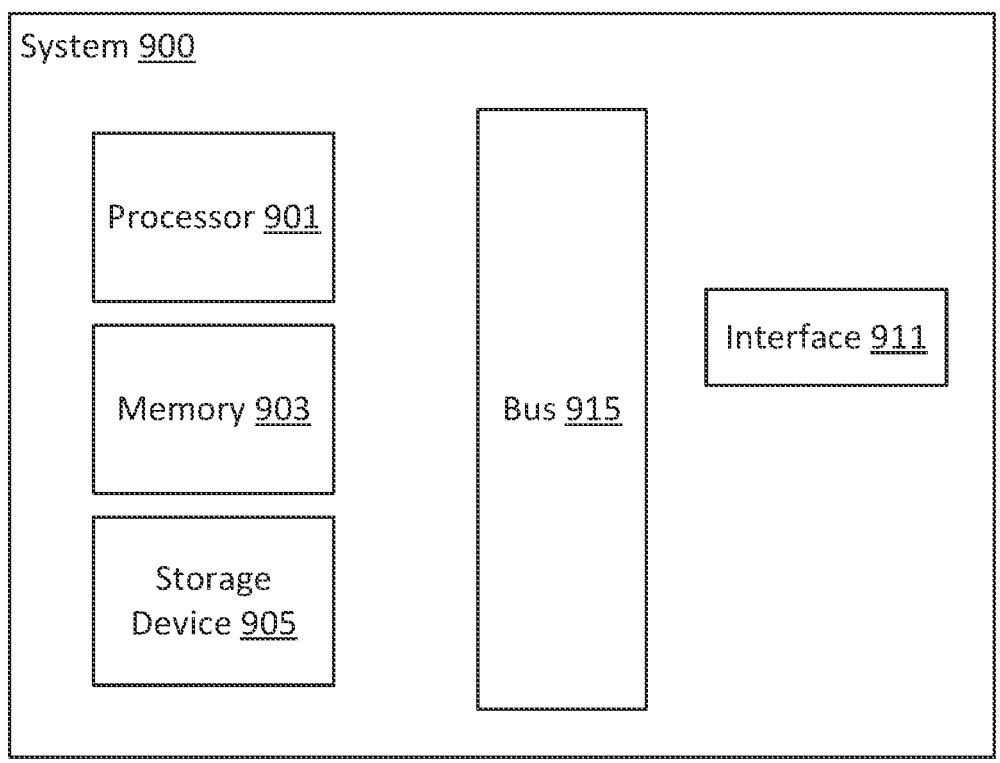
FIG. 9 illustrates one example of a computing device. According to various embodiments, a system suitable for implementing embodiments described herein.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric). System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
storing, by a computing device, an executable contract in a ledger, wherein the executable contract is for a test to be performed on a network and includes terms for the test;
receiving, by the computing device, an indication of traffic that is received at a network device, wherein the traffic is generated based on the terms for the test;
querying, by the computing device, the ledger to determine if the traffic is associated with the executable contract that is stored in the ledger based on characteristics of the traffic and the terms of the test stored in the ledger;
responsive to determining that the traffic is associated with the executable contract, responding, by the computing device, to the network device with a response indicating that the traffic is associated with the executable contract, wherein the network device allows the traffic to be sent to a destination on the network to perform an operation for the test; and
responsive to determining that the traffic is not associated with the executable contract, responding, by the computing device, to the network device with a response indicating that the traffic is not associated with the executable contract, wherein the network device decides whether to allow the traffic to be sent to a destination or not.

2. The method of claim 1, further comprising:
receiving, at a first agent, a request for the test from a second agent; and
storing the executable contract in the ledger if the request is accepted.

3. The method of claim 2, wherein:
the first agent stores a first version of the executable contract in the ledger, and
the second agent stores a second version of the executable contract in the ledger, wherein the terms of the test in the first version and the second version are the same.

4. The method of claim 1, wherein the terms comprise information that is usable to send the traffic to the destination.

5. The method of claim 1, wherein:
the executable contract is stored in a first block in the ledger, and
a result for the test is stored in a second block in the ledger.

6. The method of claim 1, wherein the executable contract comprises a condition that is used to initiate the test.

7. The method of claim 1, wherein querying the ledger to determine the traffic is associated with the executable contract comprises:

comparing a source address to a destination address for the traffic to the terms of the executable contract to determine that the source address to the destination address is associated with the test.

8. The method of claim 1, further comprising:

storing information for the executable contract in a storage location outside of the ledger; and using the information for the executable contract in the storage location to determine that the traffic is associated with the executable contract.

9. The method of claim 8, wherein a subset of executable contracts in the ledger is stored in the storage location.

10. The method of claim 1, wherein information for a result of the test is stored in the ledger.

11. The method of claim 1, wherein the terms comprise a type of test, a surface that indicates where to send the traffic, and a time for the test to be performed.

12. The method of claim 1, wherein the traffic comprises first traffic, the method further comprising:

receiving an indication of second traffic that is received at the network device;

determining that the second traffic is not associated with the executable contract that is stored in the ledger based on the terms of the test; and responding to the network device with a response indicating that the second traffic is not associated with the executable contract, wherein the network device does not allow the traffic to be sent to a destination on the network.

13. A non-transitory computer-readable storage medium containing instructions, that when executed, control a computer system to be operable for:

storing an executable contract in a ledger, wherein the executable contract is for a test to be performed on a network and includes terms for the test;

receiving an indication of traffic that is received at a network device, wherein the traffic is generated based on the terms for the test;

querying the ledger to determine if the traffic is associated with the executable contract that is stored in the ledger based on characteristics of the traffic and the terms of the test stored in the ledger;

responsive to determining that the traffic is associated with the executable contract, responding to the network device with a response indicating that the traffic is associated with the executable contract, wherein the network device allows the traffic to be sent to a destination on the network to perform an operation for the test; and responsive to determining that the traffic is not associated with the executable contract, responding to the network device with a response indicating that the traffic is not associated with the executable contract, wherein the network device decides whether to allow the traffic to be sent to a destination or not.

14. A method comprising:

storing, by a computing device, an executable contract in a ledger, wherein the executable contract includes terms for a test of a network;

receiving, by the computing device, an indication that the executable contract has met a condition to execute;

sending, by the computing device, an authorization to perform the test of the network, wherein traffic to perform the test is prepared according to the terms for test and the traffic is sent to the network;

querying the ledger to determine if the traffic is associated with the executable contract that is stored in the ledger based on characteristics of the traffic and the terms of the test stored in the ledger; and responsive to determining that the traffic is associated with the executable contract, storing, by the computing device, a result for the test in the ledger, wherein the result is based on the traffic that is sent to the network.

15. The method of claim 14, further comprising:

sending, at a first agent, a request for the test to a second agent; and storing the executable contract in the ledger if the request is accepted.

16. The method of claim 14, wherein the traffic is prepared by generating traffic using a source address to a destination address based on the terms for the test.

17. The method of claim 14, wherein:

the executable contract is stored in a first block in the ledger, and a result for the test is stored in a second block in the ledger.

18. The method of claim 14, wherein the terms comprise a type of test, a surface that indicates where to send the traffic, and a time for the test to be performed.

19. The method of claim 14, wherein the executable contract comprises a condition that is used to initiate the test.

20. The method of claim 14, wherein responsive to determining that the traffic is associated with the executable contract, the method further comprising:

responding to a network device with a response indicating that the traffic is associated with the executable contract, wherein the network device allows the traffic to be sent to a destination on the network to perform an operation for the test.

* * * * *

UNITED STATES PATENT AND TRADEMARK OFFICE
CERTIFICATE OF CORRECTION

| | |
|---|---|
| PATENT NO. | : 12,244,504 B2 |
| APPLICATION NO. | : 17/655102 |
| DATED | : March 4, 2025 |
| INVENTOR(S) | : Barrett Weisshaar and Luis Campo Giralte |

Page 1 of 1

It is certified that error appears in the above-identified patent and that said Letters Patent is hereby corrected as shown below:

In the Claims

In Claim 7, Column 18, Line 66, please change "determine the traffic is associated" to -- determine if the traffic is associated --

Signed and Sealed this
Twentieth Day of May, 2025

Coke Morgan Stewart
*Acting Director of the United States Patent and Trademark Office*